United States Patent [19]

Kimura

[11] Patent Number: 4,987,499
[45] Date of Patent: Jan. 22, 1991

[54] IMAGE READING DEVICE

[75] Inventor: Kei Kimura, Kanagawa, Japan

[73] Assignee: Fuji Photo Film Co., Ltd., Kanagawa, Japan

[21] Appl. No.: 401,898

[22] Filed: Sep. 1, 1989

[30] Foreign Application Priority Data

Sep. 2, 1988 [JP] Japan .................. 63-218374

[51] Int. Cl.$^5$ ............................................. H04N 1/04
[52] U.S. Cl. ............................... 358/474; 358/475; 358/482; 350/276 R
[58] Field of Search ............ 358/400, 401, 408, 484, 358/483, 474, 475, 473, 482; 250/235, 236; 350/110, 114, 115, 276 R

[56] References Cited

U.S. PATENT DOCUMENTS 4,010,364  3/1977  Fuwa ................................. 358/484
4,058,723  11/1977  Anthony ........................... 250/235
4,707,615  11/1987  Hosaka ............................. 358/474

FOREIGN PATENT DOCUMENTS 0077513  6/1977  Japan .
0072468  5/1982  Japan .
0194871  10/1985  Japan .

Primary Examiner—Edward L. Coles, Sr
Assistant Examiner—Jerome Grant, II
Attorney, Agent, or Firm—Sughrue, Mion, Zinn, Macpeak & Seas

[57] ABSTRACT

An image reading device includes original illuminating means for applying illuminating light to a surface of an original which contains image information at an illuminating angle $\alpha$ with respect to a line normal to the surface of the original, and image reading means for reading light containing the image information and reflected by the surface of the original in response to application of the illuminating light thereto, at a reading angle $\beta$ with respect to said line normal to the surface of the original. The illuminating angle $\alpha$ and the reading angle $\beta$ are selected to meet the following relationship:

$$-\alpha - \phi \geq \beta > -90°$$

or $$-\alpha + \phi \leq \beta < 90°$$

where $\pm\phi(\phi>0)$ is an angle from the regular reflection of said illuminating light in order to remove the surface reflections from the surface of the original. Moreover, the illuminating angle $\alpha$ and the reading angle $\beta$ are selected to meet the following relationship:

$$|\beta| > |\alpha| \text{ and } \alpha\beta > 0.$$

8 Claims, 6 Drawing Sheets

IMAGE READING DEVICE

BACKGROUND OF THE INVENTION

The present invention relates to an image reading device, and more particularly to an image reading device including an illuminating means for illuminating a subject or an original bearing image information with light applied in a predetermined direction and an image reading means for reading in a predetermined direction light reflected by the original, so that extraneous reflections from the surface of the original and an image of edges of the original which is attached to a mount can be removed.

In printing and platemaking industries, image scanning reading/reproducing systems are widely used for electrically processing image information on subjects or originals to produce film original plates with a view to simplifying the printing or platemaking process and improving the quality of images which are read or reproduced.

Such an image scanning reading/reproducing system is basically constructed of an image reading device and an image reproducing device. In the image reading device, image information on a subject or an original which is fed in a sub-scanning direction is illuminated or irradiated in a main scanning direction by an illuminating means. Light reflected by the original is read by an image reading means and converted thereby to an electric signal representing image information. Then, the image information which has been photoelectrically converted by the image reading device undergoes various processes such as for gradation conversion, profile emphasis, and the like depending on platemaking conditions. Thereafter, the image information thus processed is employed to reproduce an image on an image recording medium made of a photographic film or the like. The image recorded on the image recording medium is then developed by an image developing device, and the developed image recording medium is used as a film plate for printing operation or the like.

Originals or subjects which carry image information to be read by the image reading device are often in the form of photographs or the like which are attached to mounts. Since such an original has a certain thickness, a shade is produced by its peripheral edges when it is illuminated by light and a read image of the original contains a mark or trace of the peripheral edges of the original.

The above problem will be described in greater detail with reference to FIG. 9 of the accompanying drawings which shows an image reading device. In the image reading device, a mount 4 to which an original 2 is attached is fed in the direction indicated by the arrow X, while at the same time the surfaces of the original 2 and mount 4 are illuminated obliquely by illuminating light L. emitted from a light source 6. Light R reflected by the illuminated surfaces is detected by a CCD (charge-coupled device) camera 8 and converted to an electric signal. The attached original 2 has a certain thickness, it produces a shade 10 around the peripheral edges thereof where no illuminating light is applied. The CCD camera 8 therefore reads the image information of the attached original 2 as well as the image information of the shade 10. As a result, the reproduced image contains a mark or trace of the shade 10 around the original 2.

One solution is to position another light source 12 in substantially symmetric relation to the light source 6 with respect to the reflected light R. The shade 10 can be removed by applying illuminating light $L_1$ from the light source 6 and illuminating light $L_2$ from the light source 12 to the original 2 and the mount 4.

However, the entire arrangement shown in FIG. 9 is large, complex, and expensive because of the two light sources 6, 12 required. If the subject or original 3 and the mount 4 are positionally displaced, then the positions where they are illuminated by the illuminating light $L_1$, $L_2$ are separated from each other or brought out of alignment, resulting in an irregularity in the image read by the CCD camera 8.

In cases where the original 2 which carries image information is in the form of photographic paper that produces surface reflections, the reproduced image becomes poor in quality when such surface reflections are detected by the CCD camera 8. Specifically, if the original 2 is in the form of a matte surface photographic paper, it is known that surface reflections are present within a range of about ± 45° from the specular or regular reflection of the incident illuminating light $L_1$. In order to prevent the surface reflections from reaching the CCD camera 8, the light source 6 must be positioned such that the angle $\theta$ formed between the illuminating light $L_1$ and the reflected light R is about ± 45° or greater. Therefore, the position of the light source 6 is largely limited, and the intensity of the reflected light R which reaches the CCD camera 8 is reduced since the angle $\theta$ is large. With the two light sources 6, 12 used, inasmuch as the angle $\theta$ is large, the positions a illuminated by the illuminating light $L_1$, $L_2$ are displaced to a larger extent when the attached original 2 and the mount 4 are positionally varied. Should this happen, the image read by the CCD camera 8 suffers greater irregularities, and hence no accurate image can be obtained.

SUMMARY OF THE INVENTION

It is an object of the present invention to provide an image reading device capable of reading images of high quality and high accuracy without receiving surface reflections from originals or subjects from which the images are read.

Another object of the present invention is to provide an image reading device which is of a simple arrangement that can read images of high quality and high accuracy that are free of marks or traces of peripheral edges of originals or subjects from which the images are read.

Still another object of the present invention is to provide an image reading device comprising original illuminating means for applying illuminating light to a surface of an original which contains image information at an illuminating angle $\alpha$ with respect to a line normal to the surface of the original image reading means for reading light containing the image information and reflected by the surface of the original in response to application of the illuminating light thereto, at a reading angle $\beta$ with respect to said line normal to the surface of the original and said illuminating angle $\alpha$ and said reading angle $\beta$ being selected to meet the following relationship:

$$-\alpha-\phi \geq \beta-90°$$

or $$-\alpha+\phi \leq \beta < 90°$$

where $\pm\phi(\phi>0)$ is an angle from the regular reflection of said illuminating light in order to remove the surface reflections from the surface of the original.

Yet another object of the present invention is to provide the image reading device wherein said illuminating angle $\alpha$ is selected to be in the range of $45° > |\alpha|$.

Yet still another object of the present invention is to provide the image recording device wherein said reading angle $\beta$ is selected to be in the range of $45° \geq |\beta|$.

It is also an object of the present invention to provide an image reading device comprising original illuminating means for applying illuminating light to a surface of an original which contains image information at an illuminating angle $\alpha$ with respect to a line normal to the surface of the original, image reading means for reading light containing the image information and reflected by the surface of the original in response to application of the illuminating light thereto at a reading angle $\beta$ with respect to said line normal to the surface of the o original, and said illuminating angle $\alpha$ and said reading angle $\beta$ being selected to meet the following relationship:

$$|\beta| > |\beta| \text{ and } \alpha\beta > 0$$

p A further object of the present invention is to provide the image reading device wherein said illuminating angle $\alpha$ and said reading angle $\beta$ are selected to meet the following relationship:

$$-\alpha - \phi \geq \beta > -90°$$

or $$-\alpha + \phi \leq \beta < 90°$$

where $\pm\phi(\phi>0)$ is an angle from the regular reflection of said illuminating light in order to remove the surface reflections from the surface of the original.

A still further object of the present invention is to provide the image reading device wherein said illuminating angle $\alpha$ is selected to be in the range of $45° > |\alpha|$.

A yet further object of the present invention is to provide the image reading device wherein said reading angle $\beta$ is selected to be in the range of $45° \geq |\beta|$.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
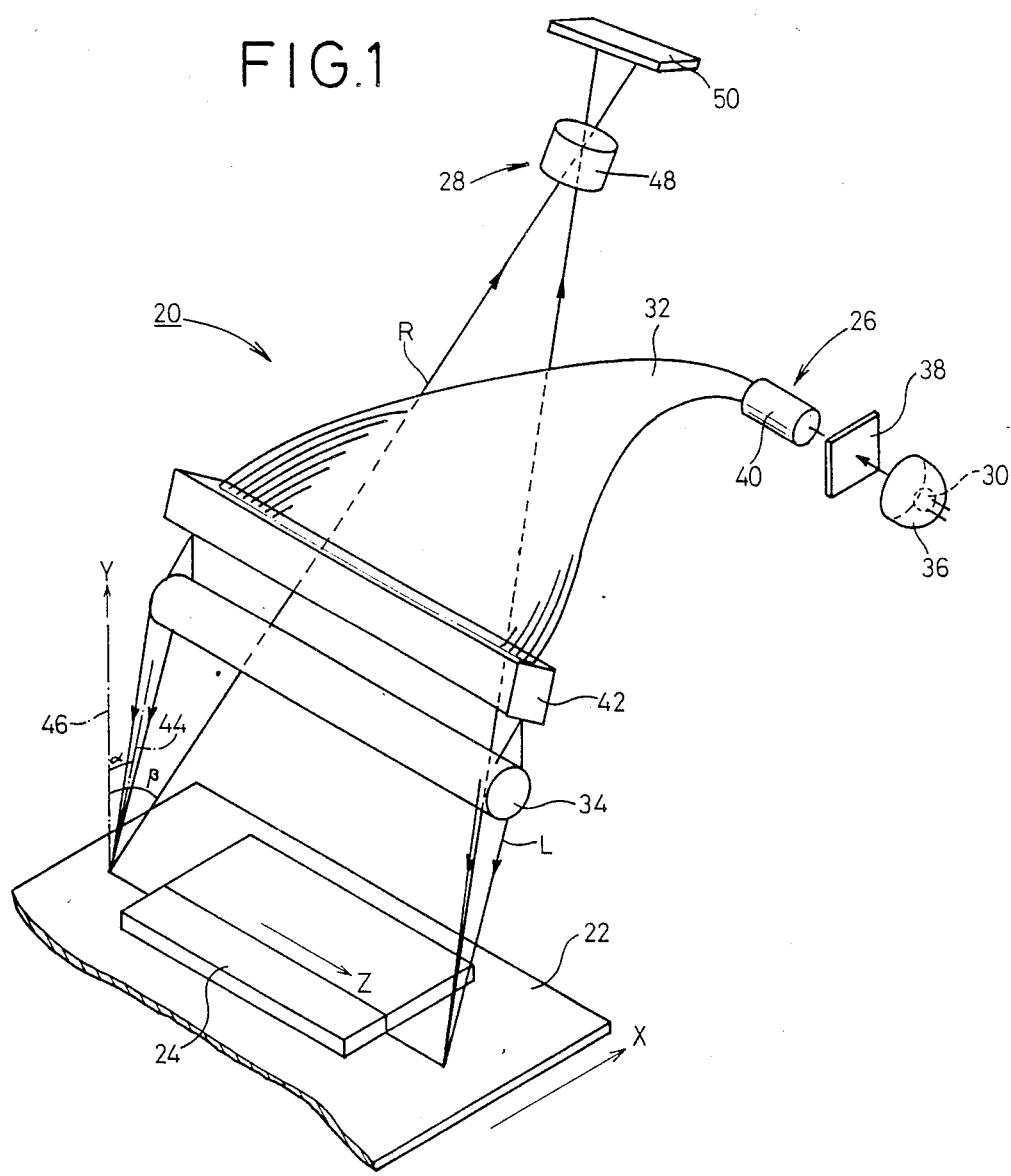
FIG. 1 is a schematic perspective view of an image reading device according to the present invention.
Figure 2:
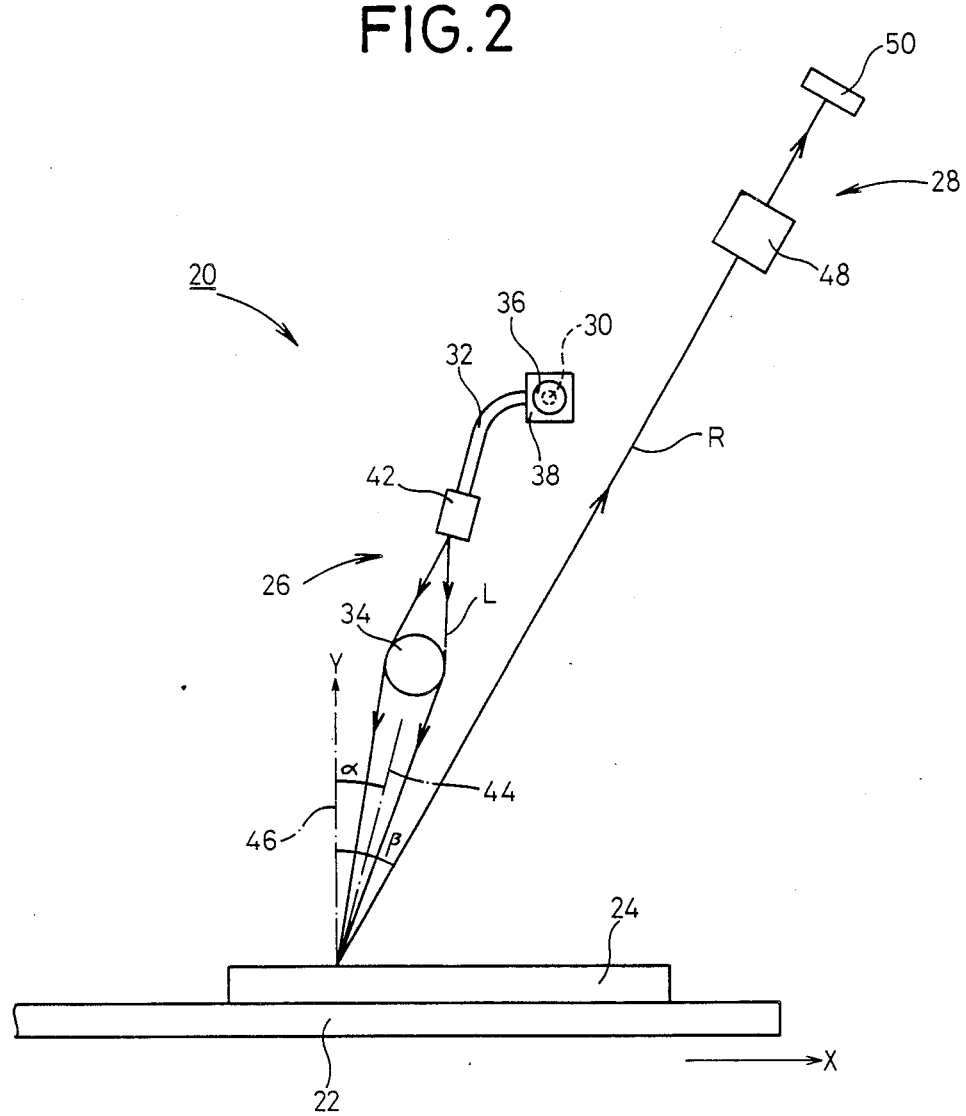
FIG. 2 is a side elevational view of the image reading device shown in FIG. 1.

As shown in FIGS. 1 and 2, an image reading device 20 according to the present invention is essentially composed of an original illuminating or irradiating means 26 for applying illuminating light L to a mount 22 which is fed in a sub-scanning direction indicated by the arrow X and an original or subject 24 attached to the mount 22 while irradiating the illuminating light L in a main scanning direction indicated by the arrow Z, and an image reading means 28 for reading an image on the original 24 based on light R reflected by the mount 22 and the attached original 24.

The original illuminating means 26 comprises a spot-like light source 30 such as a halogen lamp, a xenon lamp or the like, an optical fiber bundle 32 comprising a number of optical fibers for leading the illuminating light L from the light source 30 to the mount 22 and the attached original 24, and a cylindrical lens 34 for converging the illuminating light L along the main scanning direction indicated by the arrow Z over the mount 22.

The light source 30 is surrounded by an ellipsoidal mirror 36. The original illuminating means 26 includes an infrared absorbing filter 38 having a coating for transmitting a visible light and reflecting infrared radiation. the infrared absorbing filter 38 being disposed in confronting relation to the opening of the reflecting mirror 36. The original illuminating means 26 also has a cylindrical light guide 40 positioned on one side of the infrared absorbing filter 38 remotely from the reflecting mirror 36. The optical fiber bundle 32 has a bundled end coupled to the light guide 40. The optical fibers of the optical fiber bundle 32 should preferably comprise plastic optical fibers flexible enough to guide the illuminating light L to any desired position over the mount 22 and the attached original 24.

The other ends of the optical fibers of the optical fiber bundle 32 are curved and spaced a certain distance from the mount 22. These ends of the optical fibers are linearly arrayed and housed in an elongate housing 42 such that the array of the optical fiber ends extends along the main scanning direction indicated by the arrow Z. Between the arrayed ends of the optical fibers and the mount 22, there is disposed a cylindrical lens 34 extending parallel to the main scanning direction and having an optical axis 44 which is inclined to a line 46 normal to the surface of the original 24 by an angle $\alpha$ which will hereinafter be also referred to as an "illuminating angle $\alpha$".

The image reading means 28 comprises a focusing lens 48 and a CCD 50 for photoelectrically converting the reflected light R focused by the focusing lens 48 to an image signal. The focusing lens 48 has an optical axis which is inclined to the line 46 by an angle $\beta$ which will hereinafter be also referred to as a "reading angle $\beta$".

The image reading device of the present invention is basically constructed as described above. Its operation and advantages will be described in detail below.

The illuminating light L emitted from the light source 30 is converged by the reflecting mirror 36 and passes through the infrared absorbing filter 38 into the light guide 40. The illuminating light L is then guided by the light guide 40 to enter the bundled ends of the optical fibers of the optical fiber bundle 32. The illuminating light L travels through the optical fibers to the other ends thereof, from which the illuminating light L is applied through the cylindrical lens 34 to the mount 22 and the attached original 24 while irradiating them in the main scanning direction indicated by the arrow Z.

The mount 22 and the attached original 24 which are illuminated by the illuminating light L reflect light R containing image information. The reflected light R is focused by the focusing lens 48 onto the CCD 50 by which the light R is photoelectrically converted to an image signal. Since the mount 22 and the attached original 24 are fed by a feed mechanism (not shown) in the sub-scanning direction indicated by the arrow X, the image information on the entire surface of the original 24 is two-dimensionally read by the CCD 50.

The relationship between the illuminating angle $\alpha$ at which the attached original 24 is illuminated and the reading angle $\beta$ at which the image information is read from the attached original 24 will be described below. The coordinate system used is a right-handed coordinate system with its Y axis on the line 46 normal to the original 24. The signs of the angles are determined with respect to this coordinate system.

Figure 3:
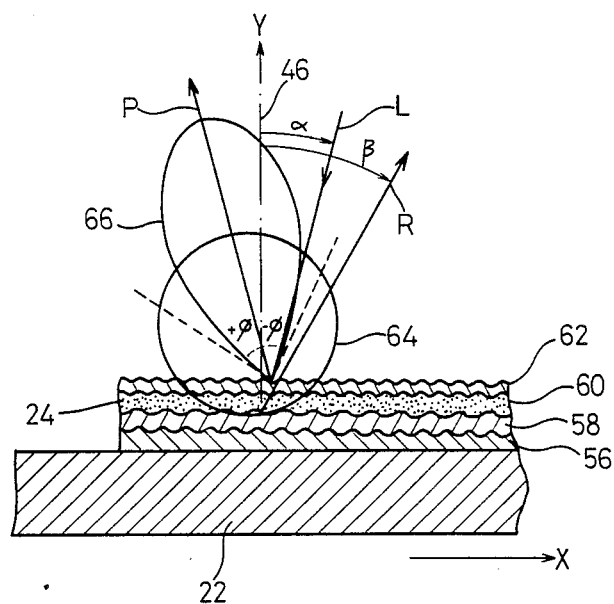
FIG. 3 is a fragmentary cross-sectional view showing the relationship between incident light and reflected light when the incident light is applied to the reflected light is received from an original in the form of a matte surface photographic paper.

The relationship between the angles for removing surface reflections from the attached original 24 will first be described. FIG. 3 shows on an enlarged scale an arrangement in which the illuminating light L is applied to the attached original 24 which is in the form of a matte surface photographic paper that has an uneven surface. The attached original 24 comprises a base 56 placed on the mount 22 a diffuse reflection layer 58 on the base 56 for reflecting light in various directions, an emulsion layer 60 bearing image information on the diffuse reflection layer 58, and a surface coating layer 62 coated on emulsion layer 60 to protect the same.

The illuminating light L applied to the object 24 is reflected by the diffuse reflection layer 58 out of a region 64 as diffuse light which bears the image information. Part of the diffuse light is reflected by the surface of the surface coating layer 62 and emitted out of a region 66 as surface diffuse reflections. If the surface diffuse reflections spread in an angle $\pm\phi(\phi>0)$ from the regular reflection P of the illuminating light L, then the illuminating angle $\alpha$ and the reading angle $\beta$ should be selected to meet the following relationship in order to remove the surface reflections from the reflected light R:

$$-\alpha-\phi \geq \beta > 90° \quad (1a)$$

or $$-\alpha+\phi \leq \beta < 90° \quad (1b)$$

Figure 4:
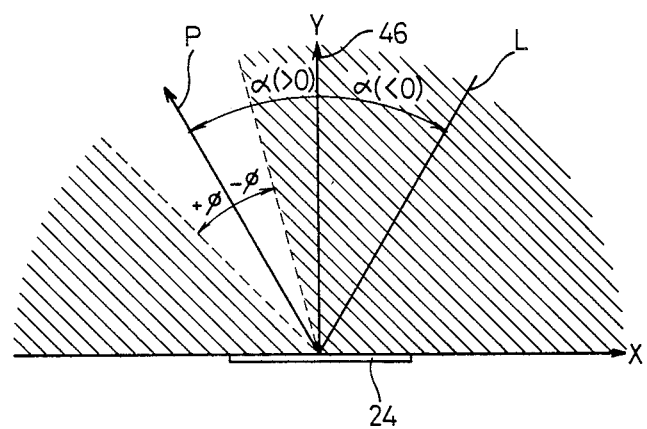
FIGS. 4, 5, 7, and 8 are diagrams illustrative of a reading angle range.

The reading angle $\beta$ is in the range which is shown hatched in FIG. 4.

With the reading angle thus selected, the surface diffuse reflections from the surface coating layer 62 do not reach the image reading means 28, but only the reflected light R which bears the image information is led to the image reading means 28. As a result, the CCD 50 converts only the reflected light R, which has been focused by the focusing lens 48, to an image signal, which will be used to reproduce a high quality image.

Since the illuminance on the surface of the original 24 is proportional to 1/cos $\alpha$, the illuminance drops sharply when the illuminating angle $\alpha$ exceeds $\pm$ 45°.

Therefore, in order to remove the surface reflections as well as to prevent the illuminance from being lowered for reading the image highly accurately, the illuminating angle $\alpha$ should be selected to meet the relationship:

$$-\alpha-\phi \geq \beta > -90° \text{ and } 45°|\alpha| \quad (2a)$$

$$-\alpha+\phi \leq \beta < 90° \text{ and } 45°> |\alpha| \quad (2b)$$

If the illuminating angle $\alpha$ and the angle $\phi$ are increased to a certain extent, the reading angle $\beta$ in the inequalities (1b), (2b) is increased, resulting in problems. More specifically, when the surface of the attached original 24 is positionally displaced in the direction indicated by the arrow Y, the image reading position varies or when the surface of the attached original 24 is pressed by a platen glass panel, astigmatism is produced by the thickness of the platen glass panel. In order to read the image more highly accurately, the conditions given by the inequalities (1b), (2b) should be removed and the reading angle $\beta$ should be given a practical range of:

$$45° \geq |\beta| \quad (3)$$

and should be selected to meet the following relationship:

$$-\alpha-\phi \geq \beta > -45° \text{ and } 45°> |\alpha| \quad (4)$$

Figure 5:
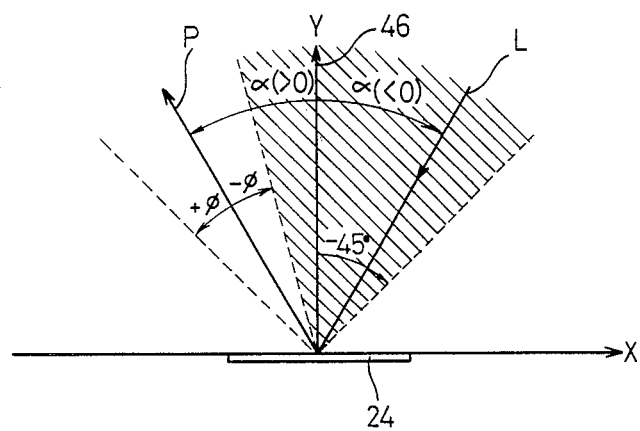

In this case, the reading angle $\beta$ is in the range which is shown hatched in FIG. 5.

Figure 6:
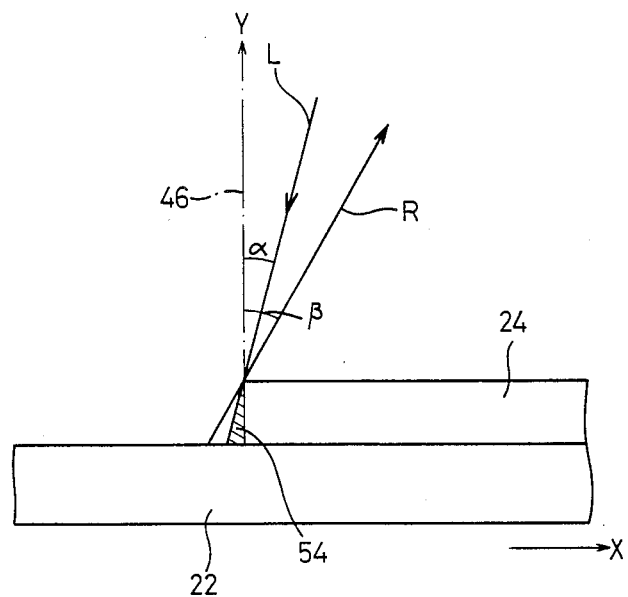
FIG. 6 is a fragmentary side elevational view showing the relationship between incident light and reflected light when the incident light is applied to and the reflected light is received from an original attached to a mount.

The angles for removing a mark or trace of the peripheral edges of the attached original 24 will be described below. As shown in FIG. 6, when the attached original 24 is illuminated by the illuminating light L at an illuminating angle $\alpha$, a shade 54 where no illuminating light L is applied is produced around the peripheral edges of the attached original 24. If the reading angle $|\beta|$ is selected to be on the side of the illuminating light L and to be larger than the illuminating angle $|\alpha|$, then the image reading means 28 does not read the shade 54 and hence the mark of the peripheral edges of the attached original 24 is removed from the reproduced image. Therefore, the illuminating angle $\alpha$ and the reading angle $\beta$ should be selected to meet:

$$|\beta|>|\alpha| \text{ and } \alpha\beta>0 \quad (5)$$

Figure 7:
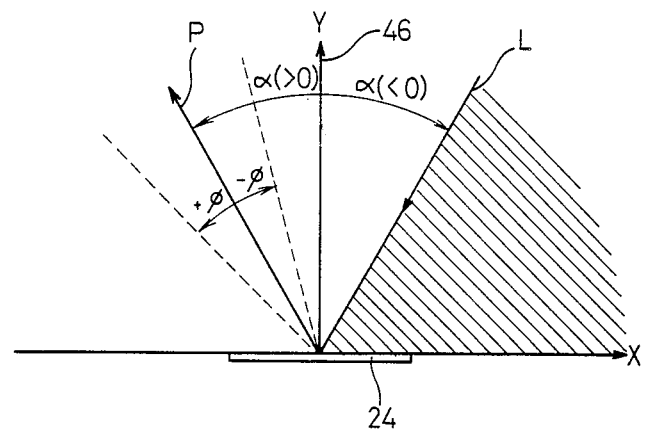

At this time the reading angle $\beta$ is in the range which is shown hatched in FIG. 7.

Figure 8:
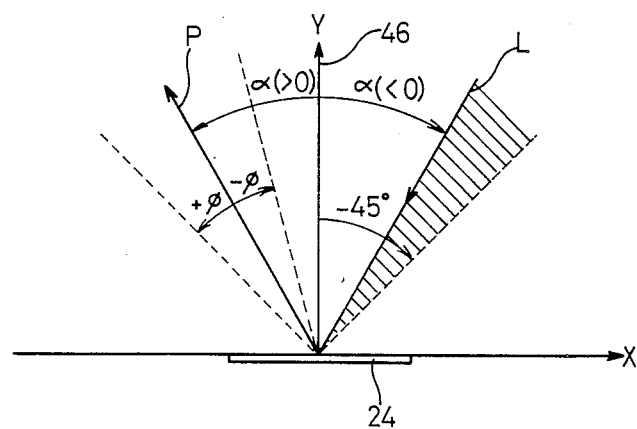
Figure 9:
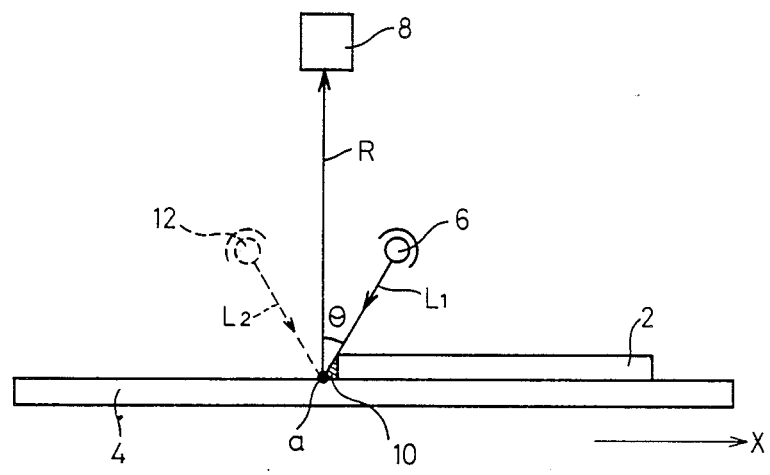
FIG. 9 is a schematic side elevational view of a conventional image reading device.

In order to remove the surface reflections from the attached original 24 and the mark or trace of the peripheral edges of the attached original 24 for reading the image highly accurately, the illuminating angle $\alpha$ and the reading angle $\beta$ should be selected to meet both the inequalities (4) and (5). Then, the reading angle $\beta$ is in the range which is shown hatched in FIG. 8. The image reading device illustrated in FIGS. 1 and 2 is arranged such that the illuminating angle $\alpha$ and the reading angle $\beta$ are selected to meet the inequalities (4) and (5).

It is known from *The Theory of the Photographic Process* (Fourth edition), pages 491 through 493, published in 1977 by Macmillan Publishing Co., Inc., U.S.A. that the intensity of the surface diffuse reflections from matte surface photographic paper largely varies in the angle range of $\pm\phi = \pm 45°$. If the angle $\phi$ is 45° and the illuminating angle is $\alpha = -$ and the reading angle is $\beta = -30°$, for example, then a high-quality image can be reproduced while removing surface reflections from the attached original 24 and avoiding a reduction in the intensity of the reflected light. The CCD 50 does not read the shade 54 produced by the illuminating light L around the attached original 24, so that the reproduced image is free of any mark or trace of the peripheral edges of the attached original 24. Since it is not necessary to use two illuminating means for the removal of the image of the shade 54 as has been the case with the conventional image reading device, the image reading device according to the present invention is highly simple in arrangement.

With the present invention, as described above, the surface of the original to be imaged is illuminated at an illuminating angle $\alpha$ by the original illuminating means and light reflected by the original is read at a reading angle $\beta$ by the image reading means. If it is assumed that an angle range to remove surface reflections from the surface of the original lies between $-\phi$ and $+\phi$, then the illuminating angle $\alpha$ and the reading angle $\beta$ are selected to meet:

$$-\alpha - \phi \geq \beta > -90°$$

or $$-60 + \phi \leq \beta < 90°$$

According to such angle settings, the surface reflections from the original which do not contain desired image information are not allowed to reach the image reading means but only reflected light bearing the image information is detected by the image reading means, so that the image reading means can produce a signal which can reproduce a high-quality image.

By selecting the illuminating angle $\alpha$ to be in the range of $45° > |\alpha|$, the illuminance on the surface of the original is prevented from being lowered, and hence the image information can be read with high accuracy.

Reading errors resulting from positional displacement of the surface of the original can be minimized by selecting the reading angle $\beta$ to be in the range of $45° \geq |\beta|$.

If the angles $\alpha$, $\beta$ are selected to meet:

$$|\beta| > |\alpha| \text{ and } \alpha\beta > 0$$

then the shade produced around the peripheral edges of the original is not read, and the reproduced image is higher in quality as it does not contain a mark or trace of the peripheral edges of the original. The image reading device is simple in construction and small in size since it does not require a plurality of original illuminating means which would otherwise be used to remove the shade around the original.

Although a certain preferred embodiment has been shown and described, it should be understood that many changes and modifications may be made therein without departing from the scope of the appended claims.

What is claimed is:

1. An image reading device comprising:

original illuminating means for applying illuminating light to a surface of an original which contains image information at an illuminating angle $\alpha$ with respect to a line normal to the surface of the original;

image reading means for reading light containing the image information and reflected by the surface of the original in response to application of the illuminating light thereto at a reading angle $\beta$ with respect to said line normal to the surface of the original; and said illuminating angle $\alpha$ and said reading angle $\beta$ being selected to meet the following relationship:

$$-\alpha - \phi \geq \beta > -90°$$

or $$-\alpha + \phi \leq \beta < 90°$$

where $\pm\phi(\phi>0)$ is an angle from the regular reflection of said illuminating light in order to remove the surface reflections from the surface of the original.

2. An image reading device according to claim 1, wherein said illuminating angle $\alpha$ is selected to be in the range of $45° > |\alpha|$.

3. An image reading device according to claim 2, wherein said reading angle $\beta$ is selected to be in the range of $45° \geq |\beta|$.

4. An image reading device comprising:

original illuminating means applying illuminating light to a surface of an original which contains image information at an illuminating angle $\alpha$ with respect to a line normal to the surface of the original;

image reading means for reading light containing the image information and reflected by the surface of the original in response to application of the illuminating light thereto, at a reading angle $\beta$ with respect to said line normal to the surface of the original; and said illuminating angle $\alpha$ and said reading angle $\beta$ being selected to meet the following relationship:

$$|\beta| > |\alpha| \text{ and } \alpha\beta > 0$$

5. An image reading device according to claim 4, wherein said illuminating angle $\alpha$ and said reading angle $\beta$ are selected to meet the following relationship:

$$-\alpha - \phi \geq \beta > -90°$$

or $$-\alpha - \phi \leq \beta < 90°$$

where $\pm\phi(\phi>0)$ is an angle from the regular reflection of said illuminating light in order to remove the surface reflections from the surface of the original.

6. An image reading device according to claim 4 or 5, wherein said illuminating angle $\alpha$ is selected to be in the range of $45° > |\alpha|$.

7. An image reading device according to any one of claims 4 and 5 wherein said reading angle $\beta$ is selected to be in the range of $45° \geq |\beta|$.

8. An image reading device according to claim 6, wherein said reading angle $\beta$ is selected to be in the range $45° \geq |\beta|$.

* * * * *